US006275200B1

(12) United States Patent
Heady et al.

(10) Patent No.: US 6,275,200 B1
(45) Date of Patent: Aug. 14, 2001

(54) METHOD AND APPARATUS FOR A TRANSPARENT NETWORK GUEST CONTROLLER

(75) Inventors: Gregory S. Heady; Anne C. Heady, both of Phoenix, AZ (US)

(73) Assignee: Lacerta Enterprises, Inc., Phoenix, AZ (US)

( * ) Notice: Subject to any disclaimer, the term of this patent is extended or adjusted under 35 U.S.C. 154(b) by 0 days.

(21) Appl. No.: 08/992,372

(22) Filed: Dec. 17, 1997

(51) Int. Cl.[7] ...................................................... G06F 17/60
(52) U.S. Cl. .................................... 345/2; 710/15; 710/18
(58) Field of Search .................................... 710/5, 15, 18; 380/24; 345/2

(56) References Cited

U.S. PATENT DOCUMENTS

| | | | | |
|---|---|---|---|---|
| 4,471,434 | | 9/1984 | Iwawaki | 705/16 |
| 4,757,488 | | 7/1988 | Nagai et al. | 369/50 |
| 4,775,976 | * | 10/1988 | Yokoyama | 371/9 |
| 4,841,442 | * | 6/1989 | Hosoyama | 364/405 |
| 4,870,577 | | 9/1989 | Karasawa et al. | 705/20 |
| 4,875,163 | | 10/1989 | Ishii | 705/20 |
| 4,879,649 | | 11/1989 | Ishii | 705/20 |
| 4,887,210 | | 12/1989 | Nakamura et al. | 705/16 |
| 5,060,185 | | 10/1991 | Naito et al. | 707/202 |
| 5,128,862 | | 7/1992 | Mueller | 705/15 |
| 5,172,314 | | 12/1992 | Poland et al. | 705/1 |
| 5,173,851 | | 12/1992 | Off et al. | 705/14 |
| 5,202,826 | | 4/1993 | McCarthy et al. | 705/14 |
| 5,235,509 | | 8/1993 | Mueller et al. | 705/15 |
| 5,256,863 | * | 10/1993 | Ferguson et al. | 380/24 |
| 5,347,451 | | 9/1994 | Fujiwara et al. | 705/16 |
| 5,388,252 | * | 2/1995 | Dreste et al. | 714/46 |
| 5,481,714 | * | 1/1996 | Pipkin et al. | 395/712 |
| 5,510,979 | | 4/1996 | Moderi et al. | 705/18 |
| 5,687,096 | * | 11/1997 | Lappen et al. | 345/2 |
| 5,715,293 | * | 2/1998 | Mahoney | 379/23 |
| 5,812,785 | * | 9/1998 | Lappen et al. | 709/231 |
| 5,845,263 | * | 12/1998 | Camaisa et al. | 705/27 |
| 5,912,743 | * | 6/1999 | Kinebuchi et al. | 358/442 |
| 6,003,015 | * | 12/1999 | Kang et al. | 705/15 |

* cited by examiner

*Primary Examiner*—Reba I. Elmore
(74) *Attorney, Agent, or Firm*—Schmeiser, Olsen & Watts

(57) ABSTRACT

A method and apparatus for controlling an electronic display comprises a guest controller transparently linked to an existing host computer system or network. The host computer network is typically a serial network of point-of-sale (POS) electronic cash registers wherein one register functions as the network server. Nevertheless, the various preferred embodiments of the present invention are readily adapted for use with a variety of host computer systems. The guest controller "listens" to information transferred in the host computer system or network and produces output to the electronic display according to predetermined preferences and formats. The guest controller and the electronic display system are manipulated and programmed using existing host input devices, such as a register keypad, without any obvious effect upon the existing computer system or network. Additionally, installation and operation of the guest controller does not require any hardware or software modifications of the existing computer network, other than a link into a communication line. The link may comprise any conventional signal splitter or connection to a serial or parallel port. The method and apparatus are particulary useful to a business providing drive-thru ordering of products, such as a fast-food restaurant.

31 Claims, 5 Drawing Sheets

METHOD AND APPARATUS FOR A TRANSPARENT NETWORK GUEST CONTROLLER

BACKGROUND OF THE INVENTION

1. Field of the Invention

This invention relates to the field of control systems. More specifically, the present invention relates to an apparatus and a method for transparent use of computer and network data and equipment by a guest electronic display controller.

2. Description of Related Art

More businesses now make use of computers and computer-driven equipment than ever before in their daily operations. With the increased use of computers, many businesses have installed computer networks to link multiple computers together, broadening the benefits that standalone computers offer. As is the case with any rapidly changing technology, businesses often desire to add new computer-related equipment as it becomes available to their existing network or standalone computers. In a network with a closed architecture, the network typically is configured to interface only with specific additional equipment as established by the manufacturer during design of the hardware and software. Accordingly, adding new equipment to an existing system may require modification by the original manufacturer or replacement of the existing system with a new network. Even in a network with open architecture, designed to accommodate new peripherals or computers, adding new equipment may risk an upset in the network, degrading performance or causing a system failure. For networks that perform critical operations, such as those used in healthcare, air traffic control, hazardous materials manufacturing, etc., an increased risk of an upset may not be tolerable. Accordingly, such business or facilities may be restricted from obtaining the benefits of improvements in computer-related equipment.

One of the services that modern businesses offer with increasing frequency is the ability to transact business while remaining in an automobile or at a walk-up structure. Consumers find such services appealing because of the convenience and efficiency with which they can complete tasks such as purchasing goods, arranging for services, conducting bank transactions, and paying bills. Drive-in or walk-up ordering is commonly associated with fast-food restaurants and dry-cleaning businesses. However, these transactions may also occur at banks or other establishments where feasible.

The outdoor communication devices currently used by walk-up or drive-in businesses also have certain disadvantages. Because such structures are generally placed in an outdoor location, they require some sort of communication link with a person or a computer. Businesses almost always have indoor devices for completing face-to-face transactions, such as a computer network or a network of point-of-sale electronic cash registers driven by computer technology. A customer can view and speak with a representative of the business while the representative processes a transaction, such as taking a food order and totaling the cost. However, conventional communication links do not provide the same level of interaction that exists in a face-to-face transaction. All that commonly exists is an intercom system for the customer and business representative to communicate verbally. Customers cannot view the actions of the representative or any indoor devices as the transaction takes place.

Given these shortcomings, many businesses have moved toward adding electronic displays in conjunction with an outdoor communication device, thereby improving the interaction of a business with its customers. Such devices may also be helpful in indoor settings, likewise to improve interaction with customers. These electronic displays can be used to communicate product features, appearance, and pricing to a customer, however, these expanded communication features require a controller and information for the electronic displays. While some or all of the needed information may already be stored in existing indoor networks or computers, no efficient mechanism exists for interfacing the electronic displays with existing systems. The conventional option is a separate control system for the electronic displays, adding cost to the use of electronic displays and duplicating some of the data storage and manipulation already occurring in the existing system. Very little, if any, patented technology exists for solving these problems. However, a few patents exist that relate generally to improvements in cash registers. Two of these references include U.S. Pat. No. 4,471,434 issued to Iwawaki and U.S. Pat. No. 4,887,210 issued to Nakamura et al. The teachings of the indicated references do not adequately overcome the problems and, more specifically, they do not provide for control of electronic displays with existing equipment and data.

In a conventional electronic display controller, a input device, such as a keyboard, and an output device, such as a computer monitor, are provided separate from existing equipment for a user to interface with the display controller. Even though electronic cash registers are used by the business to conduct transactions, these devices are not usually configured to simultaneously control an additional electronic display. Also, any data stored in or output from existing equipment must be separately stored in or output from the display controller. Essentially, this means that a business representative must operate the cash register as in a normal transaction to record the transaction in the accounting database and to generate a receipt or other forms needed for the transaction. In addition, a business representative must operate the display controller to provide the desired interaction with the customer through electronic displays. This sort of duplicated effort is inefficient and can lead to errors in processing transactions because of the confusion that may arise, particularly among relatively low-skilled, untrained service workers.

For some businesses, it may be possible for the network manufacturer to provide later a controller for electronic displays, but this quickly proves difficult. The manufacturer must reprogram the network to provide proper output signals to the electronic display. Unfortunately, using electronic displays as discussed herein requires consideration of the specific needs of individual businesses. The type of output signals needed for the electronic displays at one business may differ substantially from the type needed at another business. Cash registers, for example, are a commodity that is not typically tailored to individual business needs and it is unlikely that cash register manufacturers would be willing to do so for most small businesses. Additionally, an established business that wants to begin using electronic displays would have to purchase new cash registers tailored to control the new displays.

Even if a network was configured to control electronic displays, then a different keypad may be necessary, as with a cash register, to modify the configuration. It may also be necessary to expand the number of electronic displays or change the type of information presented. Existing keypads on cash registers are not typically used for the type of programming one would associate with configuring an electronic display controller. Typically, register keypads comprise numeric keys and a few function keys for totaling a sale, clearing an entry, etc. It may be difficult to use these same keys to configure the controller without negatively affecting the existing cash register configuration and data storage. Certainly, specialized keys could be provided, but such features increase cost.

Thus, it can be seen from the above discussion that it would be an improvement in the art to provide a device for controlling electronic displays and modifying the controller configuration using existing equipment. Unless improved and cost effective electronic display controllers are provided, it is unlikely that most businesses will be able afford the significant advantages that electronic displays offer in conducting transactions.

BRIEF SUMMARY OF INVENTION

According to a preferred embodiment of the present invention, one solution to the above problems of adding equipment to a computer network is an apparatus for controlling add-on equipment, such as an electronic display, with a guest controller transparently linked to an existing host computer system or network. The guest controller and the add-on display system may be manipulated and programmed using the existing host input devices without any obvious effect upon the existing host system. The various preferred embodiments of the present invention are readily adapted for use with a variety of host computer systems. For example, the host computer network may be a proprietary network of point-of-sale (POS) electronic cash registers wherein one register functions as a network server.

A method for controlling guest equipment is also provided that includes forming a link between the host computer system and the guest controller, manipulating the guest controller using existing host input devices, and transparently producing output to guest output devices, such as an electronic display.

For example, the guest controller may "listen" to information transferred in the host computer system or network and produce output to an electronic display according to predetermined preferences and formats. The guest controller may be manipulated and programmed using existing host input devices, such as a POS cash register keypad, without any obvious effect upon the existing computer system or network. Additionally, installation and operation of the guest controller does not require any hardware or software modifications of the existing computer network, other than a link into a network communication line. The link may comprise any conventional signal splitter or connection to a serial or parallel port. The preferred embodiments of the present invention are particulary useful to a business providing drive-thru ordering of products, such as a fast-food restaurant.

The foregoing and other features and advantages of the present invention will be apparent from the following more particular description of preferred embodiments of the invention, as illustrated in the accompanying drawings.

BRIEF DESCRIPTION OF DRAWINGS

Preferred embodiments of the present invention will hereinafter be described in conjunction with the appended drawings, where like designations denote like elements, and.

DETAILED DESCRIPTION OF THE INVENTION

According to a preferred embodiment of the present invention, a method and apparatus are provided for controlling add-on equipment, such as an electronic display, with a guest controller transparently linked to an existing host computer network. The host computer network is typically a serial network of point-of-sale (POS) electronic cash registers wherein one register functions as a network server. Nevertheless, the various preferred embodiments of the present invention are readily adapted for use with a variety of host computer systems. The guest controller and the electronic display system are manipulated and programmed using existing host input devices, such as a register keypad, without any obvious effect upon the existing computer network. Additionally, installation and operation of the guest controller does not require any hardware or software modifications of the existing computer network, other than a link into a network communication line. The electronic display may be one component of an outdoor communication structure including, for example, automated teller machines, walk-up ordering apparatus, and, more particularly, drive-in ordering apparatus. The electronic display may also be one component of an indoor communication device, such as a menu reader board.

Figure 3:
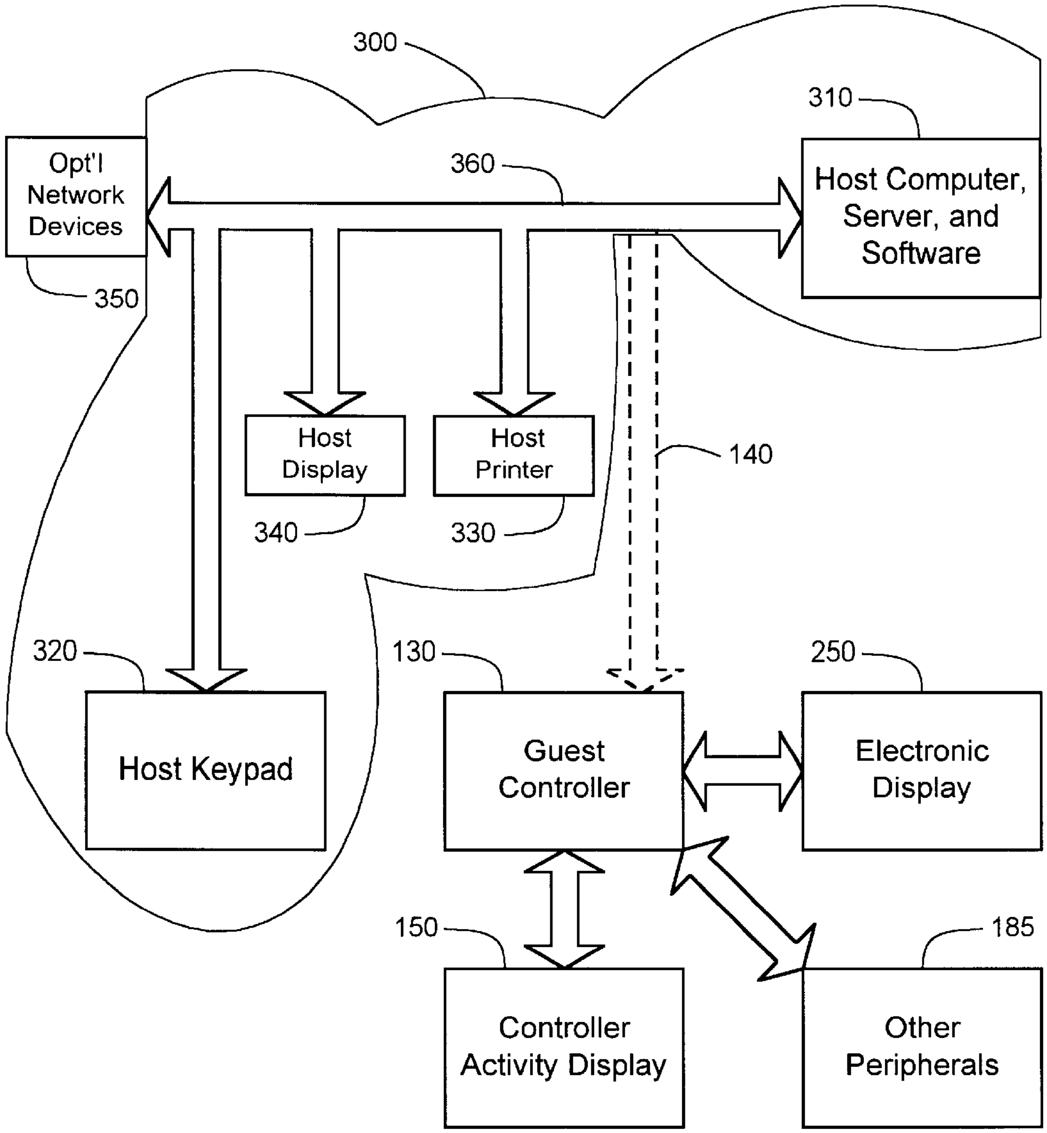
FIG. 3 is a block diagram of a guest controller linked to a computer system in accordance with a preferred embodiment of the present invention.

FIG. 3 shows a host computer system 300 associated with a guest controller 130 according to a preferred embodiment of the present invention. Host computer system 300 comprises a host computer and its associated software 310 along with input devices, such as a host keypad 320, and output devices, such as a host printer 330 and a host display 340. These various elements of host system 300 are connected by communication line 360 that may be any type of physical or logical means of connecting computer systems known in the art. This includes, but is not limited to, direct connections, Internet connection, Intranet connections, Infra Red (IR) and other forms of wireless connections. It is anticipated that many alternative methods and materials for connecting computer systems will be readily adapted for use with the present invention. This would include those methods and materials to be developed in the future. Host system 300 may also be connected through communication line 360 to optional network devices 350, such as network servers, computer systems, peripherals, etc., and host system 300 may optionally constitute a network server as indicated in FIG. 3. Further, guest controller 130 is linked with a host computer system 300 through a link 140. The concept behind guest controller 130 is to transparently use information, such as data and instructions, transferred between host computer 310 and other devices. These data and instructions include keypad data transferred from host keypad 320, print data transferred to host printer 330, display data transferred to host display 340, and network data transferred to and from optional network devices 350. The transferred information is used in host computer system

300 to operate host printer 330 and host display 340 through input from host keypad 320. Host computer 310 uses the keypad data input by a user through host keypad 320 to determine what operations are to be performed. The results of such operations are then output to host printer 330 and/or host display 340 where the user can view the output.

Figure 4:
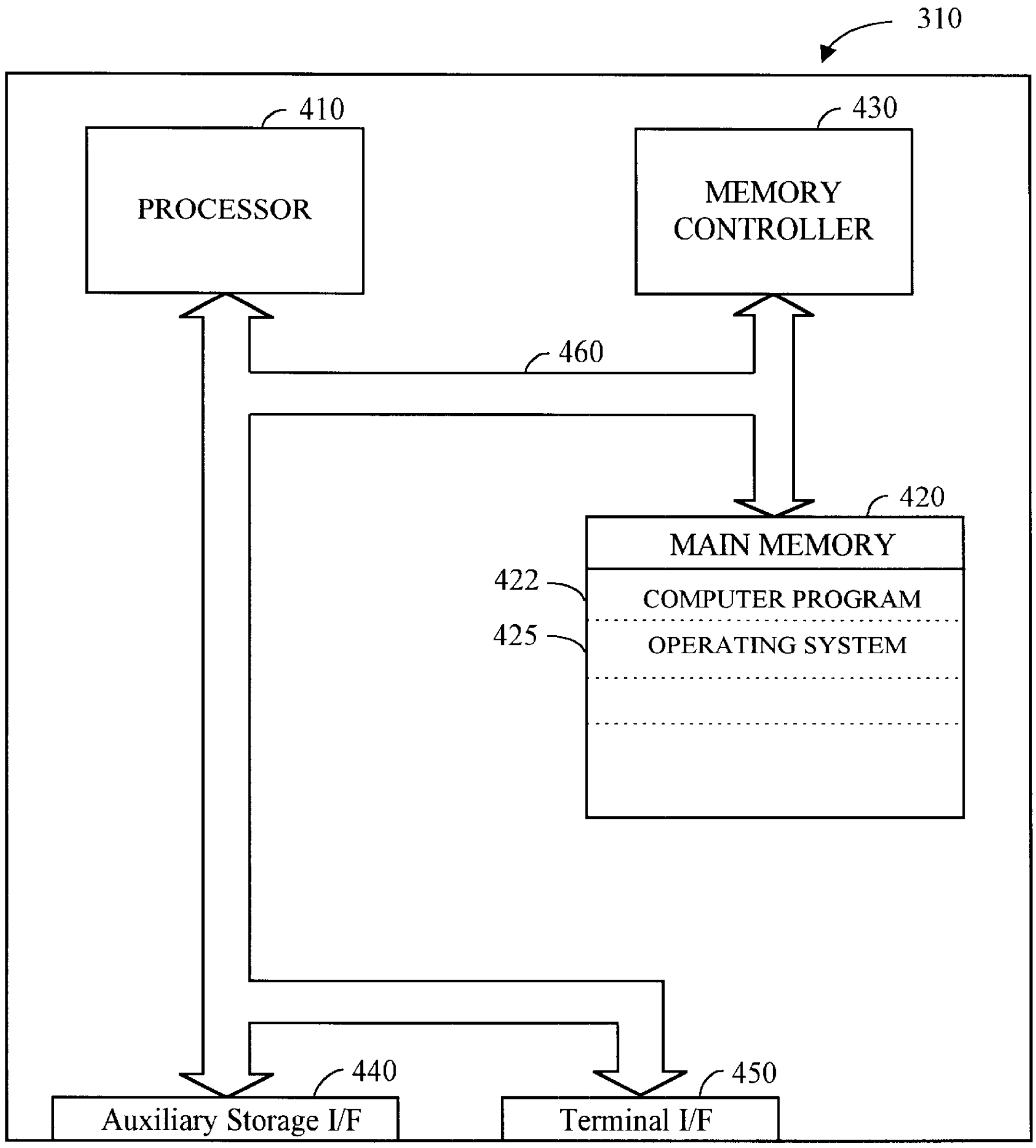
FIG. 4 is a block diagram of the host computer shown in FIG. 3.

FIG. 4 displays host computer 310 with additional detail to better describe its operation. A host computer 310 in accordance with a preferred embodiment of the present invention is a POS electronic cash register. However, those skilled in the art will appreciate that the methods and apparatus of the present invention apply equally to any computer system, regardless of whether the computer system is a complicated multi-user computing apparatus or a single user device such as a personal computer or workstation. Host computer 310 suitably comprises a processor 410, main memory 420, a memory controller 430, an auxiliary storage interface 440, and a terminal interface 450, all of which are interconnected via a system bus 460. Note that various modifications, additions, or deletions may be made to host computer 310 illustrated in FIG. 4 within the scope of the present invention such as the addition of cache memory or other peripheral devices. For example, in a POS electronic cash register, there may not be any need to provide auxiliary storage interface 440. FIG. 4 is presented to simply illustrate some of the salient features of host computer 310.

Processor 410 performs computation and control functions of host computer 310, and comprises a suitable central processing unit (CPU). Processor 410 may comprise a single integrated circuit, such as a microprocessor, or may comprise any suitable number of integrated circuit devices and/or circuit boards working in cooperation to accomplish the functions of a processor. Processor 410 suitably executes computer program 422 within main memory 420.

Auxiliary storage interface 440 allows host computer 310 to store and retrieve information from auxiliary storage devices, such as magnetic disk (e.g., hard disks or floppy diskettes) or optical storage devices (e.g., CD-ROM). Memory controller 430, through use of a processor (not shown) separate from processor 410, is responsible for moving requested information from main memory 420 and/or through auxiliary storage interface 440 to processor 410. While for the purposes of explanation, memory controller 430 is shown as a separate entity, those skilled in the art understand that, in practice, portions of the function provided by memory controller 430 may actually reside in the circuitry associated with processor 410, main memory 420, and/or auxiliary storage interface 440.

Terminal interface 450 allows system administrators and computer programmers to communicate with host computer 310, normally through input devices such as host keypad 320 and output devices such as host printer 330 and host display 340. Although host computer 310 depicted in FIG. 4 contains only a single main processor 410 and a single system bus 460, it should be understood that the present invention applies equally to computer systems having multiple processors and multiple system buses. Any connection means that supports bi-directional communication in a computer-related environment could be used for system bus 460.

Main memory 420 suitably contains one or more computer programs 422 and an operating system 425. Computer program 422 in memory 420 is used in its broadest sense, and includes any and all forms of computer programs, including source code, intermediate code, machine code, and any other representation of a computer program. The term "memory" as used herein refers to any storage location in the memory space of host computer 310.

It should be understood that main memory 420 will not necessarily contain all parts of all mechanisms shown. For example, portions of computer program 422 and operating system 425 may be loaded into an instruction cache (not shown) for processor 410 to execute, while other files may well be stored on magnetic or optical disk storage devices (not shown). In addition, although computer program 422 is shown to reside in the same memory location as operating system 425, it is to be understood that main memory 420 may consist of multiple disparate memory locations.

Referring now both to FIGS. 3 and 4, host computer system 300 may, for example, be used to conduct a sales transaction. A product identification or price is entered through host keypad 320 or other input device, such as a uniform product code (UPC) scanner (not shown) connected to terminal interface 450. As directed by computer program 422, host computer 310 registers the input and then outputs the entry through terminal interface 450 to host display 340 where the viewer can confirm proper entry. Subsequent products or prices can be registered individually and, when entry is complete, a "total" command is sent to host computer 310 through keypad 320. As directed by computer program 422, host computer 310 then adds the entries to compute a subtotal, computes any added cost, such as sales tax, and outputs the total cost to host display 340. After a user enters the amount of payment received, host computer 310 computes any change due, outputs the amount to host display 340, and outputs the registered entries to host printer 330 for printing of a receipt indicating, for example, individual entries, subtotal, total, and change due. Obviously, host computer 310 may be programmed to perform multiple other functions, such as processing payment by credit card or personal check, deducting coupon or other discounts, and recording the transaction in a database for later billing under a charge account or other purposes.

Notably, throughout the course of a transaction such as the one described above, information is transferred between host computer 310 and other devices or between particular elements within host computer 310. According to a preferred embodiment of the present invention, guest controller 130 is capable of understanding the "language" or transfer protocol used by host computer system 300. "Language" specifications can be obtained from the manufacturer of a particular host computer system 300 if the computer does not use a standard "language" or protocol for communication. For example, if host computer 310 is a desktop or mainframe computer, then it is likely to use a standard protocol. However, if host computer 310 is more specialized, such as a POS electronic cash register, it might not use a standard protocol.

By further providing a link 140 with host computer system 300, information can be collected regarding any transaction for which computer 310 is used. Such links include any conventional signal splitter presently available and may also include a direct connection to a parallel or serial port. If the information is obtained from a parallel or serial port (not shown) associated with terminal interface 450, then a software modification in host computer 310 may be required to direct host computer 310 to send duplicate information to the port. That is, whenever information is transferred from host computer 310 to another device discussed above, identical information is also transferred to a parallel or serial port to which guest controller 130 is linked. Such a software modification could be made by simply adding a new write line to a computer program for each write line that exists therein, directing output of information to another device. Those skilled in the art will recognize that this type of modification can be easily accomplished by many different technologies. While a software modification would be simple, it would nonetheless require the cooperation of the software makers. In the case of POS registers, it is likely that the software of existing registers is not as readily modifiable as it is with desktop or mainframe computers. Because of the difficulty with making the simple changes, some businesses may be forced to either purchase a new register with modified software already installed or to forgo linking guest controller 130 to host computer 310. Accordingly, the option of using a signal splitter as the link 140 between host system 300 and guest controller 130 can be very important.

Referring to FIG. 3, guest controller 130 is connected to link 140 as well as output devices such as a controller activity display 150, an electronic display 250, and other peripherals 185. Other peripherals 185 may alternatively include input devices, such as a keyboard, printer, PC card interface, bar code reader, badge reader, credit card reader, wireless communication device, etc. Guest controller 130 is configured to transparently use information, such as data and instructions, transferred between host computer 310 and other input or output devices, such as those described above. The transferred information is used in guest controller 130 to operate electronic display 250 and controller activity display 150 and also to allow manipulation and programming of guest controller 130 through input from host keypad 320. Essentially, guest controller is programmed to perform specific functions in response to certain information received through link 140. Some of the information received through link 140 will be active information transferred within host computer system 300 to control its various related components. Guest controller 130 may also react to active information, using it to control output to electronic display 250 or activity display 150. Other of the information will be dormant information which host system 300 will typically ignore, but which will manipulate guest controller 130 or be used by it to control output. In general, a number of keystrokes will exist for any host system 300 that will not elicit any reaction by host computer 310. For example, in typical a POS register, depressing any numeric key followed by the "clear all," "clear entry," or similar key will be typically ignored by host computer 310 within the POS register. Thus, it would be considered dormant information.

Figure 5:
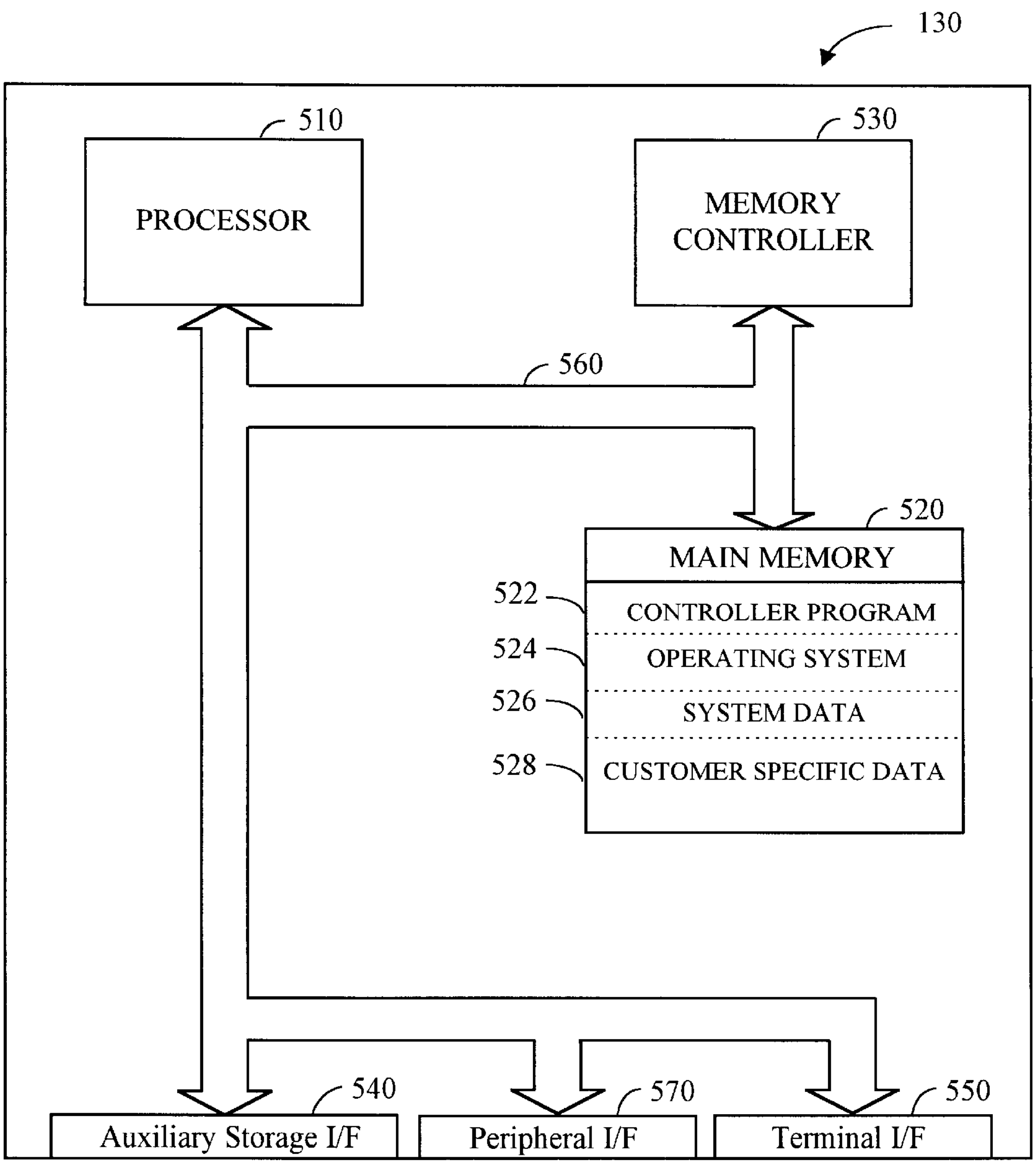
FIG. 5 is a block diagram of the guest controller shown in FIGS. 1–3.

FIG. 5 displays guest controller 130 with additional detail to better describe its operation in a similar fashion to FIG. 4. Guest controller 130 and host computer 310 comprise many similar elements. For instance, processor 510, main memory 520, memory controller 530, auxiliary storage interface 540, terminal interface 550, and system bus 560 each function in a manner similar to their counterparts of the same name in host computer 310. From a physical standpoint, the basic elements may be very different since guest controller 130 fulfills a different purpose than host computer 310. However, because the elements are described above in an elementary fashion, the previous discussion is generic to both.

Notably, a preferred embodiment of guest controller 130 differs substantially from host computer 310 by virtue of a controller program 522 in main memory 520 and also by virtue of operating system 525 also in main memory 520. Controller program 522 is designed to drive guest controller 130 in the manner described above by reacting to predetermined active information and also predetermined dormant information received through link 140. In a preferred embodiment where host computer system 300 is a POS register, guest controller 130 receives active information such as individual product or price entries from host keypad 320, subtotal computations, total computations, payment received entries, and change due computations. Controller program 522 in turn is designed to use such information in producing a predetermined output to electronic display 250 through terminal interface 550.

For example, as a user enters individual products for purchase, a list of items purchased is formed in electronic display 250 for viewing by a customer, perhaps even accompanied by images of the items that are stored in main memory 520 as user specific data 528. In addition, when entries are complete, a subtotal is displayed along with any sales tax and coupon discount followed by display of the total. Other information could be produced for output to electronic display 250 by controller program 522, depending on the type of business and availability of information either from host computer 310, main memory 520, system data 526, user specific data 528, or storage devices connected to auxiliary storage interface 540. User specific data 528, for example, might include product information not existent in host system 300 and system data 526 might include information collected through link 140. It is a clear advantage that all the output to electronic display 250 can be produced completely transparent to host computer system 300 and any user. The user need not prompt guest controller 130 while making product entries to display the information and the operation of guest controller 130 does not influence host computer system 300. Further, link 140 to host computer system 300 can be made without any modification to computer program 422 or operating system 425 of host system 300.

In addition, a user may use the concept of dormant information to input control sequences at host keypad 320 that will manipulate guest controller 130 without affecting host system 300. As time passes, a business may desire to change the form of the output to electronic display 250 or other functions of guest controller 130. A preferred embodiment of the present invention, provides that controller program 522 reacts to dormant information in a manner that allows manipulation of guest controller 130 without affecting host system 300. To easily enable such manipulation, a controller activity display 150 separate from electronic display 250 may be provided. Such a device is helpful in the event that electronic display 250 is in a location remote from keypad 320 and host display 340 is not suitable for monitoring the activity of controller activity. This is the typical circumstance when host system 300 is a POS register.

In a preferred embodiment of the present invention, depressing a certain numeric key or keys followed by the "clear all" key and then the "clear entry" key comprises a control sequence for programming and controlling guest controller 130. Even though the keying sequence was dismissed as dormant information by host computer 310, the same dormant information received through link 140 by guest controller 130 will manipulate guest controller 130 and/or its components. By providing helpful output to controller display 150 relating to the processing of active and dormant information, a user can easily verify current settings for guest controller 130 and modify them as desired using only the existing host keypad 340. Accordingly, the guest controller 130 functions or form of output to electronic display 250 can be manipulated without affecting host system 300.

At times, it may also be necessary to modify controller program 522 or certain functions of guest controller 130 when controller program 522 cannot accommodate such modifications. For example, perhaps controller program 522 is upgraded and needs to be replaced with a new version. Also, perhaps the business has changed to a different host computer system 300 such that a different controller program 522 is needed to interpret the transfer protocol of the new system. The presence of a PC card interface 570 can easily remedy just such a problem.

To facilitate increased versatility for a wide range of users, many modem computers use slots known as Peripheral Component (PC) slots. PC slots provide an industry standard expansion card/slot interface which allows different types of PC cards to be quickly and easily added to an existing computer system. These PC cards can be configured with various hardware/software components and used to expand or add various features or functional capabilities to a computer (i.e., expanded memory, multi-processor capabilities, etc.). In addition, PC cards can also be configured with adapters for various connecting cables which allow a computer to interface with a host of external peripheral devices, thereby further increasing the functionality and/or versatility of the computer system. To provide a wide variety of expansion capabilities for guest controller 130, a PC card slot (not shown) may be connected to peripheral interface 570. A PC card may contain additional memory providing upgraded controller program 522 information to accomplish the modifications indicated above.

Figure 1:
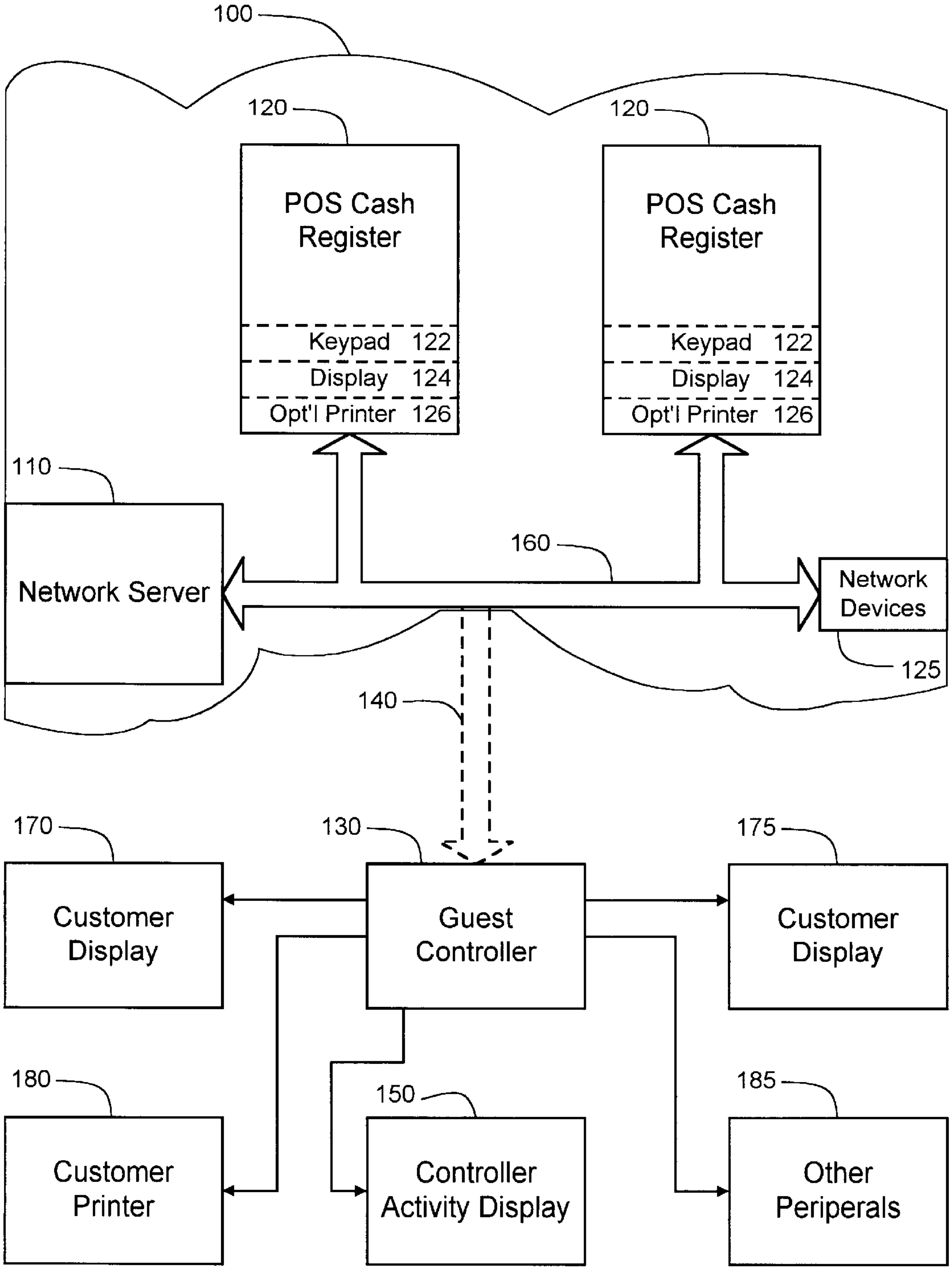
FIG. 1 is a block diagram of a guest controller linked to a proprietary network of point-of-sale registers according to a preferred embodiment of the present invention.

FIG. 1 shows a preferred embodiment according to the present invention wherein guest controller 130 is connected through link 140 to a host serial network 100 of network server 110 and POS electronic cash registers 120. Host serial network 100 is typically a proprietary network having a closed architecture and including a network server 110, typically housed within a POS register, in serial connection through communication line 160 with POS cash registers 120. POS cash registers 120 comprise a keypad 122, a display 124, and an optional printer 126. Registers 120 may also comprise a computer (not shown) capable of operating similar to host computer 310 as to keypad 122, display 124, and printer 126 in conjunction with network server 110. It is also possible for registers 120 to rely solely upon network server 110 for their computing requirements.

Essentially, host serial network 100 replaces host computer system 300. Link 140 functions identically in the embodiment shown in FIG. 1 to the embodiment shown in FIG. 3. The primary difference, however, is that link 140 collects information transferred to and from server 110 and each register 120 instead of a single host computer 310. Accordingly, guest controller 130 and its associated controller program 522 must be capable of discerning between information as to each register 120 and sending output accordingly to one or more output devices. In one embodiment, guest controller 130 only responds to information for transactions entered at one of registers 120. Such would be the case when one of registers 120 is dedicated to transacting all the drive-thru business while remaining registers transact the walk-in business. Alternatively, it may be that guest controller 130 responds to information entered at some plurality of registers 120. Regardless of the arrangement, it is important that any signal splitter for link 140 be placed appropriately in network communication line 160. For host serial network 100 according to a preferred embodiment, the signal splitter can be placed in any portion of network communication line 160 and have access to all information transferred to and from the network server. For other types of networks consideration must be given as to whether placement of the signal splitter will limit access through link 140 to only some part of the information transferred to and from network server 110.

As before, guest controller 130 is connected to link 140 as well as output devices such as a controller activity display 150, customer displays 170, 175, and 180, and other peripherals 185. Alternatively, the apparatus could comprise any number of displays that guest controller might be capable of controlling. Also as before, activity display 150 provides helpful information as to the settings and modification of settings for guest controller 130. Also, the various customer displays 170, 175, and 180 serve a similar function to electronic display 250 and operate essentially the same. Each customer display is a mechanism for communicating information from serial network 100 to customers.

As an alternative to registers 120 being in a serial network, they could instead be in an ethernet network, parallel network, etc. All that is required for a preferred embodiment is that link 140 somehow have access to the information transferred between the network server 110 and registers 120. Although guest controller 130 could still function without access to all information transferred in and out of the network server, such an arrangement is not preferred since guest controller 130 cannot act upon information unless it receives the information through link 140, through some similar communication arrangement, or from its own data storage. Depending on the desired functions of guest controller 130, it may also need to interpret some or all of the information received, that is, to discern the source where the information is coming from and the destination where it is going to, as well as the nature or purpose of the information. Such determination is typically possible by discerning information packet identification numbers, device identification numbers or addresses, and other such similarly termed information depending on the specific type of network. Guest controller 130 may then determine how it should react to the information received. Also, it is understood by those of ordinary skill in the art that the invention is not limited to networks of two registers and a server, but instead encompasses any network of registers. Further, the network need not be a network of registers 120, but instead could comprise a network of computer workstations, terminals, desktop computers, etc. In the broadest sense of the word "terminal" as it is used herein, a network of POS registers 120 is considered one of many types of networks of computer terminals. Again, guest controller 130 simply needs access to the information transferred through the network.

Figure 2:
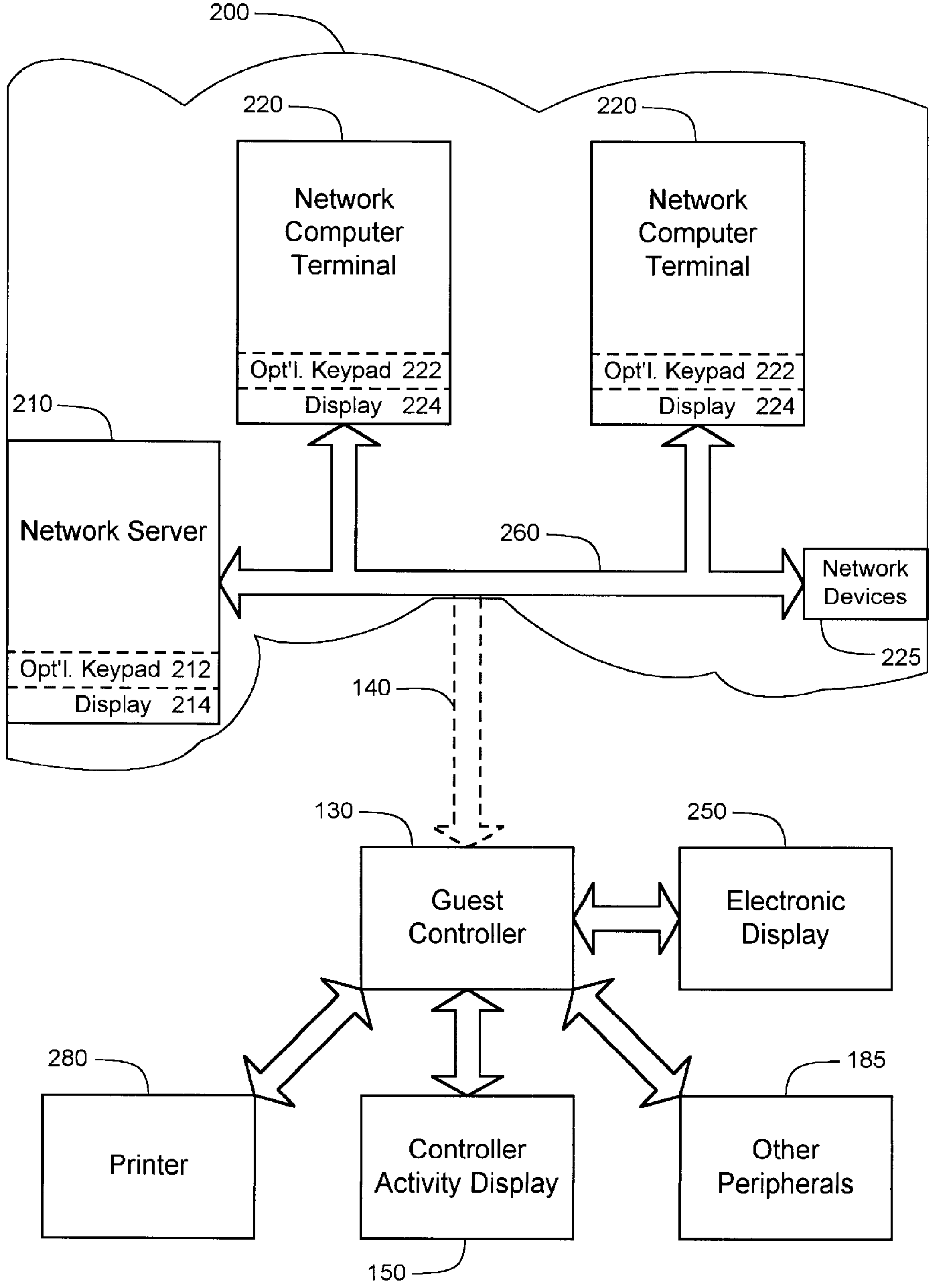
FIG. 2 is a block diagram of a guest controller linked to a network of computer terminals according to a preferred embodiment of the present invention.

One such alternative embodiment is described in FIG. 2, wherein guest controller 130 is connected through link 140 to a host terminal network 200 of network server 210 and computer terminals 220. Host terminal network 200 is typically a network having an open architecture and including a network server 210, often a performance-enhanced desktop computer, in connection through communication line 260 with terminals 220. Such a network may be established by using conventional network software for interfacing computer terminals 220 such as MICROSOFT WINDOWS 95™, MICROSOFT NT™, or NOVEL NETWARE™. Network server 210 comprises an optional keypad 212 and a display 214. Similarly, terminals 220 comprise an optional keypad 222 and a display 224, wherein displays 214 and 224 may comprise a touch-sensitive screen functioning essentially as a keypad. A printer may be included separately along with other network devices 225. Terminals 220 typically comprise a computer capable of operating similar to host computer 310 as to keypad 222 and display 224 in conjunction with network server 210. It is also possible for terminals 220 to rely solely upon network server 210 for their computing requirements.

Link 140 functions identically in the embodiment shown in FIG. 2 to the embodiment shown in FIG. 1. As before, guest controller 130 is connected to link 140 as well as output devices such as a controller activity display 150, electronic display 250, other peripherals 185, and printer 280. Alternatively, the apparatus could comprise any number of displays that guest controller might be capable of controlling. In a preferred embodiment of guest controller 130, it is connected through link 140 to a relatively outdated terminal network 200 only capable of driving displays 214 and 224 in monochrome. Guest controller 130 may be configured to recognize certain types of information received from terminal network 200 and to assign different colors to the information. Electronic display 250 then comprises multiple substitute displays (not shown) capable of displaying information in color. Accordingly, purchase of a new terminal network 200 is avoided and yet information is enhanced in new color displays as determined by guest controller 130. In addition, the color displays are implemented without the risk of upsetting the operation of terminal network 200.

Conceivably, a software and/or hardware upgrade to an existing terminal network 200 or other type of network may allow implementation of new equipment, such as color displays, that a business desires to use. Also, for an open architecture system, it may be possible to modify network settings and simply connect the new equipment to the network. However, adding new equipment to a network typically increases the risk of an upset in the network, degrading performance or causing a system failure. For networks that perform critical operations, such as those used in healthcare, air traffic control, hazardous materials manufacturing, etc., an increased risk of an upset may not be tolerable. Accordingly, such business or facilities may use a guest controller and associated elements discussed herein to obtain the benefits of improvements in computer-related equipment without the risk of an upset. In some cases, installing a guest controller may also be more economical than an upgrade, especially in light of the downtime associated with swapping equipment during an upgrade and retraining personnel.

It is important to note that while the present invention has been described in the context of a fully functional computer system, those skilled in the art will appreciate that the mechanisms of the present invention are capable of being distributed as a program product in a variety of forms, and that the present invention applies equally regardless of a particular type of signal bearing media used to actually carry out the distribution. Examples of signal bearing media include: recordable type media such as floppy disks, hard drives, CD-ROMs and transmission type media such as digital and analog communication links over electrical, optical, and wireless mediums. Depending on the configuration of the computer system on which such a program product may be installed, it may be desirable to provide a custom communication card along with the program product. Such a card includes an integrated circuit card accompanied by the necessary processors, memory, and/or interfaces to establish link 140 between guest controller 130 and a host, for example, host 100, 200, or 300. Essentially, the custom communication card and program product allow the use of multiple types of readily available computer systems to fabricate guest controller 130 and connect it to a host.

In keeping with the principles described herein, multiple other embodiments may be conceived wherein guest controller 130 is used to enhance the presentation and/or processing of information transferred through a network or within a standalone computer. That is, while the invention has been particularly shown and described with reference to preferred embodiments thereof, it will be understood by those skilled in the art that various changes in form and details may be made therein without departing from the spirit and scope of the invention. Accordingly, unless otherwise specified, any dimensions or configurations of the apparatus indicated in the drawings or herein are given as an example of possible dimensions or configurations and not as a limitation.

What is claimed is:

1. An apparatus comprising a guest controller, the guest controller being capable of linking with a point-of-sale host computer system, wherein manipulation or programming of the guest controller through at least one host input device occurs transparent to the point-of-sale host computer system, and wherein the guest controller controls an electronic display in response to the manipulation or programming.

2. The apparatus of claim 1, wherein the guest controller transparently collects information transferred in the host computer system and produces output to the electronic display in accordance with predetermined preferences and formats.

3. The apparatus of claim 1, wherein a plurality of predetermined keying sequences performed on the host computer system are ignored by the host computer system but operate as control sequences for the guest controller.

4. The apparatus of claim 1, wherein the host computer system comprises a host computer network, having a plurality of network terminals and a plurality of keypads, wherein the guest controller may be transparently manipulated or programmed through input provided by at least one keypad.

5. The apparatus of claim 4, wherein the host computer network comprises a plurality of point-of-sale registers in a serial network, wherein a serial link exists between the guest controller and the serial network.

6. The apparatus of claim 5, wherein a plurality of predetermined keying sequences are ignored by the host computer network, but operate as control sequences for the guest controller, and one control sequence comprises depressing at least one numeric key, a clear all key, and a clear entry key.

7. An apparatus comprising a guest controller, the guest controller linking with a plurality of point-of-sale registers having a plurality of keypads, wherein the guest controller can be manipulated or programmed through the keypads, and wherein the guest controller controls one or more electronic displays and wherein the guest controller transparently collects information transferred by the plurality of point-of-sale registers and produces output to the one or more electronic displays in accordance with predetermined preferences and formats.

8. The apparatus of claim 7, wherein a plurality of predetermined keying sequences performed one of the plurality of point-of-sale registers are ignored by the serial network, but operate as control sequences for the guest controller, and one control sequence comprises depressing at least one numeric key, a clear all key, and a clear entry key.

9. An guest controller comprising:

at least one processor;

at least one memory coupled to the at least one processor;

a guest controller program residing in the memory, the guest controller program linked to a point-of-sale register host system, the guest controller program receiving dormant information from the link with the point-of-sale register host computer system, wherein the point-of-sale register host computer system does not react to the dormant information and wherein the dormant information facilitates manipulation of the guest controller program through the host computer system occurs transparent to the host computer system, and wherein the guest controller program to controls an electronic display in response to the received dormant information.

10. The guest controller of claim 9, wherein the host computer system comprises a host computer network, having a plurality of network terminals and a plurality of keypads, wherein the guest controller program is capable of providing a guest controller reaction to dormant information input from at least one network keypad to manipulate or program the guest controller.

11. The guest controller of claim 9, wherein a plurality of predetermined keying sequences are ignored by the host computer network, but operate as control sequences for the guest controller program.

12. The guest controller of claim 9, wherein the guest controller program is capable of transparently discerning a source and a destination for active or dormant information received through the link and producing output to the electronic display in accordance with predetermined formats.

13. The guest controller of claim 12, wherein the guest controller monitors the point-of-sale register current ordering information and controls the electronic display such that current ordering information is displayed.

14. A method for controlling a guest electronic display comprising the steps of:

forming a link between a point-of-sale register host computer system having at least one host input device and a guest controller having an output to one or more guest output devices; and manipulating or programming the guest controller through the at least one host input device and producing output to the one or more guest output devices in a manner transparent to the host computer system.

15. The method of claim 14, wherein a plurality of predetermined keying sequences are ignored by the host computer system but operate as control sequences for the guest controller.

16. The method of claim 14, wherein the guest controller transparently collects information transferred in the point-of-sale register host computer system and produces output to one or more guest output devices in accordance with predetermined preferences and formats to display current ordering information on the one or more guest output devices.

17. The method of claim 16, wherein the guest output devices comprise a plurality of electronic displays.

18. The method of claim 14, wherein the host computer system comprises a host computer network, having a plurality of network terminals and a plurality of keypads, wherein the guest controller may be transparently manipulated or programmed through input provided by at least one keypad.

19. The method of claim 18, wherein the host computer network comprises a plurality of point-of-sale registers in a serial network, wherein a serial link exists between the guest controller and the serial network.

20. The method of claim 19, wherein a plurality of predetermined keying sequences are ignored by the host computer network, but operate as control sequences for the guest controller, and one control sequence comprises depressing at least one numeric key, a clear all key, and a clear entry key.

21. A program product comprising:

a guest controller program, the guest controller program linked to a point-of-sale register host system, the guest controller program receiving dormant information from the link with the point-of-sale register host computer system, wherein the point-of-sale register host computer system does not react to the dormant information and wherein the dormant information facilitates manipulation of the guest controller program through the host computer system occurs transparent to the host computer system, and wherein the guest controller program to controls an electronic display in response to the received dormant information; and computer-readable signal bearing media bearing the guest controller program.

22. The program product of claim 21, wherein the computer-readable signal bearing media comprises recordable media.

23. The program product of claim 21, wherein the computer-readable signal bearing media comprises transmission media.

24. The program product of claim 21, wherein the guest controller program is capable of transparently discerning a source and a destination for active or dormant information received through the link and producing output to one or more electronic displays in accordance with predetermined preferences and formats.

25. The program product of claim 21, wherein the host computer system comprises a host computer network, having a plurality of network terminals and a plurality of keypads, wherein the guest controller program is capable of providing a guest controller reaction to dormant information input from at least one network keypad to manipulate or program the guest controller.

26. The program product of claim 21, wherein a plurality of predetermined keying sequences are ignored by the host computer network, but operate as control sequences for the guest controller program.

27. The program product of claim 21, additionally comprising a custom communication card for establishing the link between the guest controller and host computer system.

28. An order information display system comprising:

an electronic display;

a guest controller, the guest controller coupled to a point-of-sale register system, the guest controller monitoring the point-of-sale register system for current order information, the guest controller controlling the electronic display such that current order information is displayed on the electronic display; and wherein the guest controller further monitors the point-of-sale register system for dormant information entered on the point-of-sale register, wherein the dormant information comprises entered data ignored by the point-of-sale register system, and wherein the dormant information is used to program or manipulate the guest controller.

29. The order information display system of claim 28 wherein a plurality of predetermined keying sequences performed on the point-of-sale register are ignored by the point-of-sale register system but operate as control sequences for the guest controller to facilitate control of the electronic display.

30. The order information display system of claim 29 wherein the predetermined keying sequences include depressing at least one numeric key, a clear all key, and a clear entry key.

31. The order information display system of claim 28 wherein the order information displayed by the electronic display includes price and product information for the current order.

* * * * *

UNITED STATES PATENT AND TRADEMARK OFFICE

CERTIFICATE OF CORRECTION

PATENT NO. : 6,275,200 B1
DATED : August 14, 2001
INVENTOR(S) : Heady et al.

It is certified that error appears in the above-identified patent and that said Letters Patent is hereby corrected as shown below:

Claim 12,
Line 40, "...in accordance with predetermined formats." should read as follows -- ...in accordance with predetermined preferences and formats. --

Signed and Sealed this

Ninth Day of April, 2002

*Attest:*

JAMES E. ROGAN
*Director of the United States Patent and Trademark Office*

*Attesting Officer*